3,092,396
TRAILER FRAME
Benjamin F. Thomas, R.D. 3, Greencastle, Pa.
Filed Mar. 10, 1961, Ser. No. 94,794
4 Claims. (Cl. 280—106)

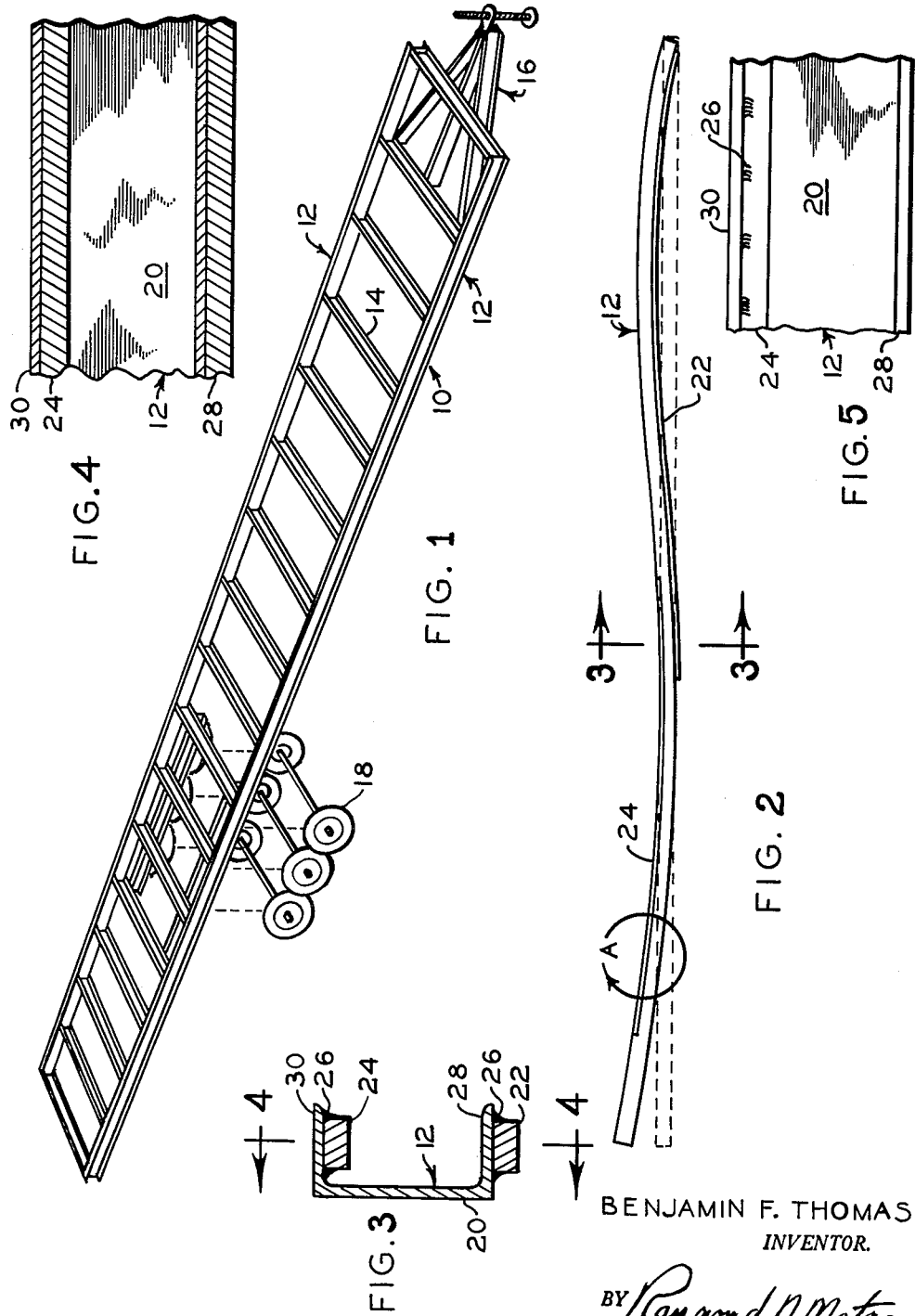

This invention relates generally to vehicle frames and more particularly to an improved frame for mobile house and truck trailers and similar mobile structures.

Trailer frames are well known in the art and as a whole, do not constitute an optimum solution to one of the major problems of house trailer design. This is the provision of a frame which embodies the necessary strength and rigidity for the heavy loads involved without also embodying excessive weight and bulkiness. In many prior designs, excessive bowing and bending downwardly of the frame due to the high bending loads imposed thereon has been avoided by merely providing longitudinal members of substantial depth or thickness to directly increase the problems of excessive weight and bulkiness.

Accordingly, the main object of the present invention is to provide an improved trailer frame characterized by a maximum of strength and a minimum of bulkiness.

An important object of the present invention is to provide an improved trailer frame having novel prestressed members.

Another important object of the present invention is to provide an improved trailer frame some of the members of which comprise combination prestressed and unstressed members.

A further important object of the present invention is to provide an improved beam for use in mobile frame structures.

A still further important object of the present invention is to provide an improved high strength trailer frame which is simple in design and susceptible of ready and economic manufacture, and which is rugged and of long life in use.

Other objects and advantages of the invention will become apparent during the course of the following description.

In the drawings I have shown one embodiment of the invention. In this showing:

FIGURE 1 is a perspective view of the trailer frame comprising the present invention;

FIGURE 2 is a side elevational view of one of the longitudinal beams of the frame of FIGURE 1;

FIGURE 3 is a vertical, transverse sectional view to an enlarged scale taken on the line 3—3 of FIGURE 2;

FIGURE 4 is an enlarged, fragmentary, vertical sectional view taken on the line 4—4 of FIGURE 3; and FIGURE 5 is a fragmentary elevational view also to an enlarged scale of the portion A of FIGURE 2.

In its broadest aspects, the invention contemplates the use of beams formed of unstressed members attached to members which are prestressed by bending them into an S curve so that under load, the curved members tend to straighten and after straightening out absorb a part of the load and the straightening out simultaneously places a tension load in the unstressed members (which hold the S-curved members in stressed condition) to carry the remainder of the load.

Referring to the drawings, numeral 10 designates the trailer frame as a whole which comprises a spaced pair of parallel, longitudinal side beams 12, a plurality of longitudinally spaced cross beams 14 joined as by welding to the side beams, a suitable hitch assembly 16 arranged at the front of the frame, and a plurality of wheels 18 suitably supported from the frame by spring suspensions at an intermediate point on the frame at which the curvature changes to provide a running gear for the trailer.

The prestressed member of the side beams 12 and the cross beams 14 are of steel or other suitable metal and preferably in the form of channels although other cross-sectional shapes may be utilized.

The side beams 12, one of which is shown in FIGURE 2, each comprise a prestressed member 20 and lower and upper unstressed tension members 22 and 24 (FIGURES 2-4 inclusive). The members 20 are deformed by bending to take an S shape (exaggerated in FIGURE 2) while cold whereby the metal is "cold worked" and thereby "prestressed" and held in the prestressed S shape by the tension members 22 and 24. The amount of bending or curvature imparted to the beam is determined by the amount of the final load to be carried. The amount of deformation is preferably chosen so that the final load, taking into account that part of the load carried by the unstressed tension members 22 and 24, will cause the frame 10 to deflect back into a substantially straight condition while stretching the tension members 22 and 24.

After the beam members 20 have been deformed, a lower tension member 22 is attached by a plurality of spaced tack welds 26 (FIGURES 2-4 inclusive) to the lower surface of the lower channel flange 28 of the channel member 20. The tension member 22 preferably extends rearwardly from a point adjacent the front end of the frame 10 to a point beyond the midpoint of the beam 12.

The upper tension member 24 is next similarly attached by tack welding at spaced points 26 along its length to the lower surface of the upper channel flange 30 and preferably extends from a point adjacent the rear end of the side beam 12 to a point which overlaps the rear end of the lower tension member 22.

It will be noted that the tension members are thus securely attached to the channel flanges and particularly so at their overlapping portions which, being at the area of change of direction of curvature, are under substantially no tension during load. As the trailer frame is loaded, the channels 20 of the side beams 12 have a further tendency to straighten and at the same time, the tension members 22 and 24 are stretched, thereby absorbing a major part of the overall load.

It will be appreciated that the cross beams 14 may be constructed in the same manner as the side beams 12 to even further reduce the weight and bulkiness of the trailer frame 10 while affording a maximum of strength.

It will now be apparent that the trailer frame comprising the present invention is of simple design although of great strength and made possible by the novel construction of the side beams 12 with their prestressed and unstressed members.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A side beam for a trailer frame comprising an elongated channel deformed from a straight condition into an S shaped curve, and means for retaining the channel in deformed condition comprising a lower tension member attached to a flange of said channel along its concave edge from one end thereof, and an upper tension member attached to the other flange of said channel along its concave edge from the other end thereof.

2. A device as recited in claim 1 wherein the inner ends of said tension members overlap adjacent the change of curvature of said channel member.

3. A trailer frame comprising a pair of longitudinal beams, the said beams including members deformed from a straight condition into an S shaped curve, a plurality of lateral beams connecting said longitudinal beams, a wheel support means on the frame intermediate its ends and located substantially at the point on the frame at which the curvature changes in said members, and means for retaining said members in deformed condition comprising a lower tension member attached to each of said deformed members along their concave edge at one end of the frame, and an upper tension member attached to each of said deformed members along their concave edge at the opposite end of the frame, the inner ends of said tension members overlapping adjacent the curvature change of said deformed members.

4. A trailer frame comprising a pair of longitudinal beams, the said beams including members deformed from a straight condition into an S shaped curve, a plurality of lateral beams connecting said longitudinal beams, a wheel support means on the frame intermediate its ends and located substantially at the point on the frame at which the curvature changes in said members, and means for retaining said members in deformed condition comprising a lower tension member attached to each of said deformed members along their concave edge at one end of the frame, and an upper tension member attached to each of said deformed members along their concave edge at the opposite end of the frame, said deformed members being channels, and said lower and upper tension members being fixed to the flanges of said channels.

References Cited in the file of this patent

UNITED STATES PATENTS

| | | |
|---|---|---|
| 1,318,694 | Roesch | Oct. 14, 1919 |
| 1,453,954 | Scholtes | May 1, 1923 |
| 2,039,398 | Dye | May 5, 1936 |
| 2,077,454 | Almdale | Apr. 20, 1937 |
| 2,105,713 | Werdehoff | Jan. 18, 1938 |
| 2,389,907 | Helmuth | Nov. 27, 1945 |
| 2,982,580 | Lewis | May 2, 1961 |